United States Patent
Harris et al.

(10) Patent No.: US 10,432,914 B2
(45) Date of Patent: Oct. 1, 2019

(54) GRAPHICS PROCESSING SYSTEMS AND GRAPHICS PROCESSORS

(71) Applicant: ARM Ltd, Cambridge (GB)

(72) Inventors: Peter William Harris, Cambridge (GB); Robin Paul Fell, Cambridge (GB); Sandeep Kakarlapudi, Trondheim (NO)

(73) Assignee: Arm Limited, Cambridge (GB)

( * ) Notice: Subject to any disclaimer, the term of this patent is extended or adjusted under 35 U.S.C. 154(b) by 108 days.

(21) Appl. No.: 15/683,653

(22) Filed: Aug. 22, 2017

(65) Prior Publication Data
US 2018/0061115 A1    Mar. 1, 2018

(30) Foreign Application Priority Data
Aug. 25, 2016    (GB) .................. 1614506.2

(51) Int. Cl.
*H04N 13/279* (2018.01)
*G06T 15/00* (2011.01)

(52) U.S. Cl.
CPC ........ *H04N 13/279* (2018.05); *G06T 15/005* (2013.01)

(58) Field of Classification Search
CPC .................................... H04N 13/00
See application file for complete search history.

(56) References Cited

U.S. PATENT DOCUMENTS

| 6,023,263 | A * | 2/2000 | Wood | ............... | G02B 27/2214 |
| | | | | | 345/581 |
| 2005/0270284 | A1 * | 12/2005 | Martin | ............... | H04N 13/221 |
| | | | | | 345/419 |
| 2011/0018863 | A1 * | 1/2011 | Ha | ............... | H04N 13/275 |
| | | | | | 345/419 |
| 2013/0100132 | A1 * | 4/2013 | Katayama | ............... | H04N 13/275 |
| | | | | | 345/420 |
| 2015/0379674 | A1 * | 12/2015 | Golas | ............... | G06T 1/60 |
| | | | | | 345/426 |
| 2017/0206702 | A1 * | 7/2017 | Choi | ............... | G06T 5/002 |
| 2017/0366795 | A1 * | 12/2017 | Chou | ............... | G06T 7/593 |

OTHER PUBLICATIONS

Search Report dated Feb. 16, 2017 on related United Kingdom application GB1614506.2, filed Aug. 25, 2016.

* cited by examiner

*Primary Examiner* — Phi Hoang
(74) *Attorney, Agent, or Firm* — EIP US LLP

(57) ABSTRACT

A graphics processing system includes a graphics processing pipeline, which includes a primitive generation stage and a pixel processing stage. The graphics processing system is arranged to process input data in the primitive generation stage to produce first primitive data associated with a first view of a scene and second primitive data associated with a second view of the scene. The graphics processing system is arranged to process the first primitive data in the pixel processing stage to produce first pixel-processed data associated with the first view. The graphics processing system is arranged to determine, for second pixel-processed data associated with the second view, whether to use the first pixel-processed data as the second pixel-processed data or whether to process the second primitive data in the pixel processing stage to produce the second pixel-processed data, and perform additional processing in the graphics processing pipeline based on the determining.

20 Claims, 10 Drawing Sheets

GRAPHICS PROCESSING SYSTEMS AND GRAPHICS PROCESSORS

CROSS-REFERENCE TO RELATED APPLICATION

This application claims the benefit under 35 U.S.C. § 119(a) and 37 C.F.R. § 1.55 to United Kingdom patent application no. GB 1614506.2, filed on Aug. 25, 2016, the entire content of which is incorporated herein by reference.

BACKGROUND

Field of the Disclosure

The present disclosure relates to graphics processing systems and graphics processors.

Description of the Related Technology

In known graphics processing systems, a graphics processing unit (GPU) can render two separate images to depict a three-dimensional scene. One image is for the left eye of a viewer of the scene and the other is for the right eye of the viewer. Each of the images depicts the scene from a slightly different camera position. This allows the viewer to construct a three-dimensional image or scene from the two-dimensional images.

In some known graphics processing systems, some of the graphics processing in the graphics processing system is conducted separately for each eye and some graphics processing that could be conducted separately for each eye is merged so that it is conducted concurrently for both eyes. An example of such merged graphics processing is multiview processing in which vertex shading is merged for both eyes.

There remains however scope for improvements to graphics processing systems.

SUMMARY

According to a first embodiment, there is provided a method of operating a graphics processing system. The graphics processing system includes a graphics processing pipeline including a primitive generation stage and a pixel processing stage. The method includes processing input data in the primitive generation stage to produce first primitive data associated with a first view of a scene and second primitive data associated with a second view of the scene. The method includes processing the first primitive data in the pixel processing stage to produce first pixel-processed data associated with the first view. The method includes determining, for second pixel-processed data associated with the second view, whether to use the first pixel-processed data as the second pixel-processed data or whether to process the second primitive data in the pixel processing stage to produce the second pixel-processed data. The method includes performing additional processing in the graphics processing pipeline based on the determining.

According to a second embodiment, there is provided a non-transitory computer-readable storage medium including computer-executable instructions which, when executed by a processor, cause a computing device to operate a graphics processing system, the graphics processing system including a graphics processing pipeline including a primitive generation stage and a pixel processing stage. Operating the graphics processing system includes processing input data in the primitive generation stage to produce first primitive data associated with a first view of a scene and second primitive data associated with a second view of the scene. Operating the graphics processing system includes processing the first primitive data in the pixel processing stage to produce first pixel-processed data associated with the first view. Operating the graphics processing system includes determining, for second pixel-processed data associated with the second view, whether to use the first pixel-processed data as the second pixel-processed data or whether to process the second primitive data in the pixel processing stage to produce the second pixel-processed data. Operating the graphics processing system includes performing additional processing in the graphics processing pipeline based on the determining.

According to a third embodiment, there is provided a graphics processing system including a graphics processing pipeline. The graphics processing pipeline includes a primitive generation stage and a pixel processing stage. The graphics processing system is arranged to process input data in the primitive generation stage to produce first primitive data associated with a first view of a scene and second primitive data associated with a second view of the scene. The graphics processing system is arranged to process the first primitive data in the pixel processing stage to produce first pixel-processed data associated with the first view. The graphics processing system is arranged to determine, for second pixel-processed data associated with the second view, whether to use the first pixel-processed data as the second pixel-processed data or whether to process the second primitive data in the pixel processing stage to produce the second pixel-processed data. The graphics processing system is arranged to perform additional processing in the graphics processing pipeline based on the determining.

Further features and advantages will become apparent from the following description, given by way of example only, which is made with reference to the accompanying drawings.

DETAILED DESCRIPTION

A number of examples in accordance with embodiments will now be described in the context of processing computer graphics for display.

Figure 1:
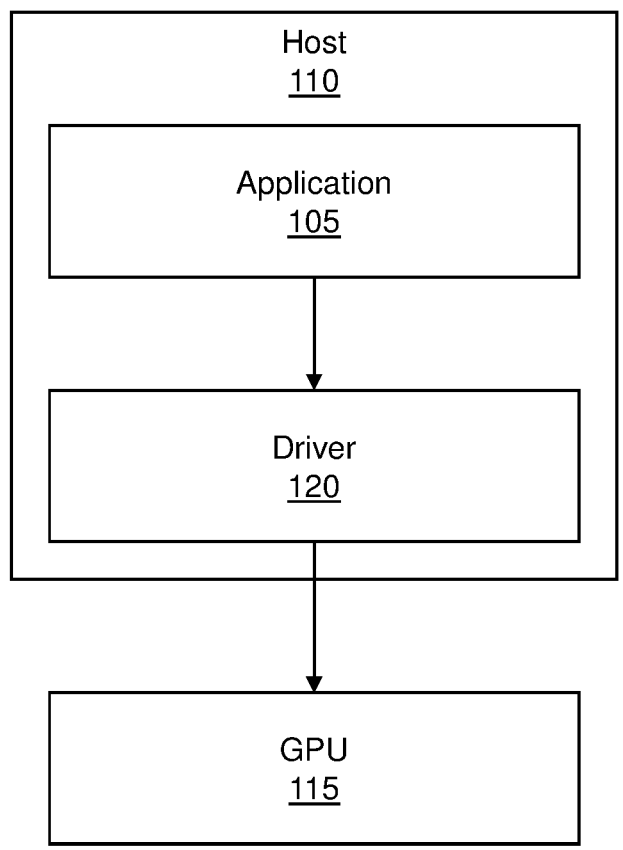
FIG. 1 shows schematically an example of a graphics processing system in accordance with an embodiment.

Referring to FIG. 1, there is shown schematically an example of a graphics processing system 100.

In this example, an application 105, such as a game, executing on a host processor 110 requests graphics processing operations to be performed by an associated GPU 115. To do this, the application 105 generates Application Programming Interface (API) calls that are interpreted by a driver 120 for the GPU 115. The driver 120 runs on the host processor 110. The driver 120 generates appropriate commands to the GPU 115 to generate the graphics output requested by the application 105. A set of commands is provided to the GPU 115 in response to the commands from the application 105. The commands may be to generate a frame to be displayed on a display.

The commands to the GPU 115 to generate an output, for example to render a frame, are provided in the form of draw call descriptors (DCDs). DCDs are generated in response to commands from the application 105 running on the host processor 110. Plural draw calls may be executed, with each having a corresponding DCD. Each draw call uses at least some of the different processing stages of a graphics processing pipeline.

Figure 2:
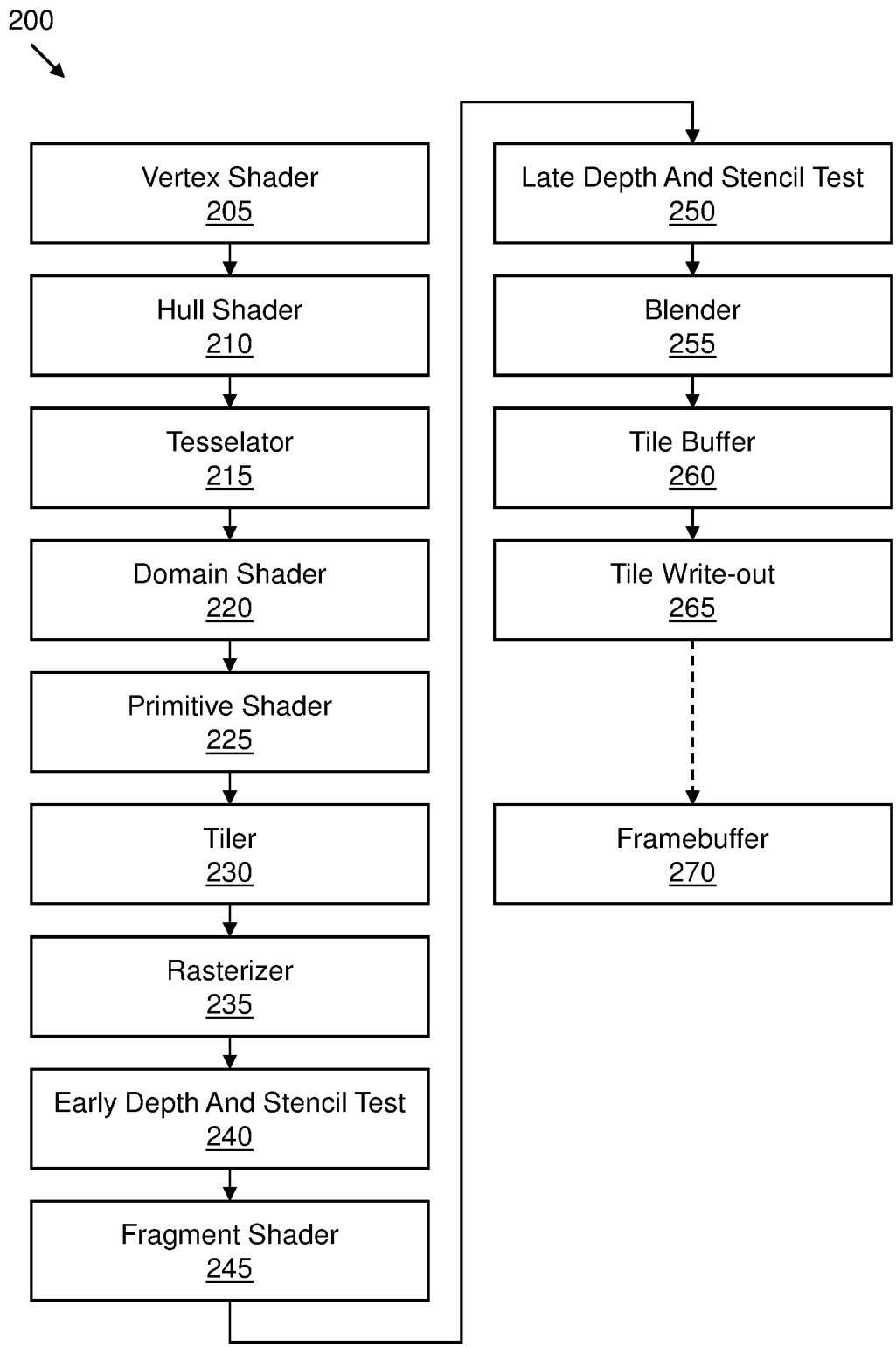
FIG. 2 shows schematically an example of a graphics processing pipeline in accordance with an embodiment.

Referring to FIG. 2, there is shown schematically an example of a graphics processing pipeline 200. The graphics processing pipeline 200 indicates a sequence of actions that may be performed by a GPU.

In this example, the GPU is a tile-based renderer. The GPU therefore produces tiles of a render output data array to be generated. The render output data array may be an output frame. Tile-based rendering differs from immediate mode rendering in that, rather than the entire render output being processed in one go, the render output is divided into a plurality of smaller sub-regions (or 'areas'). Those sub-regions are referred to herein as tiles. Each tile is rendered separately. For example, each tile may be rendered one after another. The rendered tiles are then recombined to provide the complete render output for display. In tile-based rendering, the render output may be divided into regularly sized and shaped tiles. The tiles may be square or another shape.

Other terms that may be used for tiling and tile-based rendering include "chunking", where the rendering tiles are referred to as "chunks", and "bucket" rendering. The terms tile and tiling will be used hereinafter for convenience, but it should be understood that these terms are intended to encompass all alternative and equivalent terms and techniques.

The render output data array may be an output frame intended for display on a display device, such as a screen or printer. The render output may also, for example, comprise intermediate data intended for use in later rendering passes. An example of this is a render to texture output.

When a computer graphics image is to be displayed, it may first be defined as a set of primitives (or 'geometries'). An example of a primitive is a polygon. The primitives are then divided into graphics fragments in a rasterization process. This is followed by pixel processing. During a pixel processing operation, a renderer may modify data associated with each fragment so that the fragments can be displayed correctly. Examples of such data include color and transparency. Once the fragments have fully traversed the renderer, then their associated data values are stored in memory, ready for output.

FIG. 2 shows various elements and pipeline stages associated with a GPU. There may however be other elements and stages of the graphics processing pipeline that are not illustrated in FIG. 2. It should also be noted that FIG. 2 is only schematic, and that, for example, in practice the shown functional units and pipeline stages may share hardware circuits, even though they are shown schematically as separate stages in FIG. 2. It will also be appreciated that each of the stages, elements and units, etc., of the graphics processing pipeline 200 may be implemented as desired and will accordingly comprise, for example, appropriate circuitry and/or processing logic, etc., for performing the associated operation and functions.

As shown in FIG. 2, the graphics processing pipeline 220 that the GPU executes includes a number of stages, including a vertex shader 205, a hull shader 210, a tesselator 215, a domain shader 220, a primitive shader 225, a tiler 230, a rasterization stage 235, an early Z (or 'depth') and stencil test stage 240, a renderer in the form of a fragment shading stage 245, a late Z (or 'depth') and stencil test stage 250, a blending stage 255, a tile buffer 260 and a downsampling and writeout stage 265. Other arrangements for a GPU are however possible.

The vertex shader 205 receives input data values associated with the vertices defined for the output to be generated. The vertex shader 205 processes those data values to generate a set of corresponding, vertex-shaded, output data values for use by subsequent stages of the graphics processing pipeline 200.

Each primitive to be processed may be defined and represented by a set of vertices. Each vertex for a primitive may have associated with it a set of attributes. A set of attributes is a set of data values for the vertex. These attributes may include position data and other, non-position data. The non-position data may define, for example, color, light, normal and/or texture coordinates for the vertex in question.

A set of vertices is defined for given output to be generated by the GPU. The primitives to be processed for the output comprise given vertices in the set of vertices. The vertex shading operation transforms the attributes for each vertex into a desired form for subsequent graphics processing operations. This may comprise, for example, transforming vertex position attributes from the world or user space for which they are initially defined to the screen space in which the output of the graphics processing system is to be displayed. This may also comprise, for example, modifying the input data to take account of the effect of lighting in the image to be rendered.

The hull shader 210 performs operations on sets of patch control points and generates additional data known as patch constants.

The tessellation stage 215 subdivides primitives to create higher-order representations of the hull.

The domain shader 220 performs operations on vertices output by the tessellation stage, in a similar manner to the vertex shader 205.

The primitive shader 225 processes entire primitives such as a triangles, points or lines.

The vertex shader 205, hull shader 210, tesselator 215, domain shader 220 and primitive shader 225 perform the fragment frontend operations, such as transformation and lighting operations, and primitive setup, to setup the primitives to be rendered, in response to commands and vertex data provided to the GPU.

Once all the primitives to be rendered have been appropriately set up, the tiler 230 then determines which primitives are to be processed for each tile that the render output has been divided into for processing purposes. To do this, the tiler 230 compares the location of each primitive to be processed with the tile positions, and adds the primitive to a respective primitive list for each tile that it determines the primitive could potentially fall within. Any suitable and desired technique for sorting and binning primitives into tile lists, such as exact binning, or bounding box binning or anything in between, can be used for the tiling process.

Once lists of primitives to be rendered (or 'primitive lists') have been prepared for each rendering tile in this way, the primitive lists are stored for use. The primitive lists allow the system to identify which primitives are to be considered and rendered when the tile in question is rendered.

Once the tiler 230 has prepared all of the tile lists, then each tile can be rendered. To do this, each tile is processed by the graphics processing pipeline stages that follow the tiler 230.

When a given tile is being processed, each primitive that is to be processed for that tile is passed to the rasterizer 235. The rasterization stage 235 of the graphics processing pipeline 200 operates to rasterize the primitives into individual graphics fragments for processing. To do this, the rasterizer 235 rasterizes the primitives to sampling points and generates graphics fragments having appropriate positions for rendering the primitives. The fragments generated by the rasterizer 235 are then sent onwards to the rest of the pipeline 200 for processing.

The early Z and stencil test stage 240 may perform a Z (or 'depth') test on fragments it receives from the rasterizer 235 to see if any fragments can be discarded (or 'culled') at this stage. To do this, the early Z and stencil test stage 240 compares the depth values of fragments issued by the rasterizer 235 with the depth values of fragments that have already been rendered. The depth values of fragments that have already been rendered are stored in a depth buffer that is part of the tile buffer 260. The comparison performed by the early Z and stencil test stage 240 is to determine whether or not the new fragments will be occluded by fragments that have already been rendered. At the same time, an early stencil test is carried out. Fragments that pass the fragment early Z and stencil test stage 240 are sent to the fragment shading stage 245. The fragment shading stage 245 performs the appropriate fragment processing operations on the fragments that pass the early Z and stencil tests to generate the appropriate rendered fragment data. This fragment processing may include any suitable fragment shading processes, such as executing fragment shader programs on the fragments to generate the appropriate fragment data, applying textures to the fragments, applying fogging or other operations to the fragments, etc. The fragment shading stage 245 may be a programmable fragment shader.

There is then a late fragment Z and stencil test stage 250, which carries out, amongst other things, an end of pipeline depth test on the shaded fragments to determine whether a rendered fragment will actually be seen in the final image. This depth test uses the Z-buffer value for the position of the fragment that is stored in the Z-buffer in the tile buffer 260 to determine whether the fragment data for the new fragments should replace the fragment data of the fragments that have already been rendered. This may involve comparing the depth values of the fragments issued by the fragment shading stage 245 with the depth values of fragments that have already been rendered, as stored in the Z buffer. This late fragment depth and stencil test stage 250 may also carry out late alpha and/or stencil tests on the fragments.

The fragments that pass the late fragment test stage 250 may then be subjected, in the blender 255, to any blending operations with fragments that are already stored in the tile buffer 260. Any other remaining operations necessary on the fragments, such as dither, etc. (not shown) are also carried out at this stage.

Finally, the output fragment data (or 'values') are written to the tile buffer 260. The output fragment data can then be output to a framebuffer 270 for display. The depth value for an output fragment is also written appropriately to a Z-buffer within the tile buffer 260. The tile buffer 260 stores color and depth buffers that store an appropriate color, etc., or Z-value, respectively, for each sampling point that the buffers represent. These buffers store an array of fragment data that represents part, in this example a tile, of the overall render output with respective sets of sample values in the buffers corresponding to respective pixels of the overall render output. For example, each 2×2 set of sample values may correspond to an output pixel, where 4× multisampling is used.

The tile buffer 260 is provided as part of random access memory (RAM) that is local to the graphics processing pipeline 200. In other words, the tile buffer 260 is provided in on-chip memory.

The data from the tile buffer 260 is input to a downsampling writeout unit 265, and then output (or 'written back') to an external memory output buffer, such as a framebuffer 270 of a display device (not shown). The display device could comprise, for example, a display comprising an array of pixels, such as a computer monitor or a printer.

The downsampling and writeout unit 265 downsamples the fragment data stored in the tile buffer 260 to the appropriate resolution for the output buffer and device, such that an array of pixel data corresponding to the pixels of the output device is generated. This results in output values in the form of pixels for output to the output buffer 270.

Once a tile of the render output has been processed and its data exported to a main memory for storage, for example to the frame buffer 270 in a main memory, the next tile is then processed, and so on, until sufficient tiles have been processed to generate the entire render output. The process is then repeated for the next render output and so on.

As can be seen from FIG. 2, the graphics processing pipeline 200 includes a number of programmable processing or "shader" stages, namely the vertex shader 205, the hull shader 210, the domain shader 220, the primitive shader 225, and the fragment shader 245. These programmable shader stages execute respective shader programs that have one or more input variables and generate sets of output variables. The shader program in question may be executed for each work item to be processed, for example for each vertex in the case of the vertex shader 205. An execution thread may be issued for each work item to be processed, and the thread then executes the instructions in the shader program to produce the desired, shaded, output data.

An application, such as application 105 described above with reference to FIG. 1, provides the shader programs to be executed using a high-level shader programming language, such as OpenGL® Shading Language (GLSL), High-level Shading Language (HLSL), Open Computing Language (OpenCL), etc. These shader programs are then translated by a shader language compiler to binary code for the target graphics processing pipeline 200. This may include creating one or more internal, intermediate representations of the program within the compiler. The compiler may, for example, be part of the driver 120, with there being a special API call to cause the compiler to run. The compiler execution can thus be seen as being part of the draw call preparation done by the driver in response to API calls generated by the application 105.

As described above, a known vertex shader in a multiview graphics processing system can perform vertex shading for both eyes concurrently. This may help to reduce computations and data accesses where vertex-related processing is common to both eyes. A tiler in such a system can produce a multiview tile list, in which primitive information for a tile associated with one eye and a corresponding tile associated with the other eye is stored together.

In examples described herein, commonality between primitives in the left eye view and the right eye view are exploited further. In particular, further efficiencies have been identified for subsequent graphics pipeline operations. In particular, rather than subsequent operations and stages rendering output data independently for the left eye view and the right eye view, processing can be enhanced by identifying visual commonalities between the left eye view and the right eye view and exploiting those commonalities later in the graphics pipeline. For example, rather than rendering tiles for the left eye view and the right eye view independently, pixel processing may be performed only once, for one eye rather than for both, where the left eye view and the right eye view see substantially the same scene or part of the scene. Where, for example, the data that would be shown in a left eye view tile is the same or substantially the same as that in a corresponding right eye view tile, pixel processing may be performed for the left eye view only to generate a pixel-processed tile for the left eye and that tile is used as the corresponding tile for the right-eye view. This saves in the computationally intensive operation, and associated latency and power consumption requirements, of pixel processing, where such processing can in effect be skipped or bypassed. In instances where the data that would be shown in a left eye view tile is not the same or substantially the same as that in a corresponding right eye view tile, pixel processing is performed for both eyes. The techniques described herein may also be applied in graphics processing systems in which the left view and the right view are processed separately in part of the graphics processing pipeline, but where work conducted for one of the views can be used for the other view later in the pipeline. As such, in examples described herein, rather than, in effect, rendering the same pixel twice, a pixel may be rendered once for one eye and used for the other eye, as will now be explained in more detail.

Figure 3:
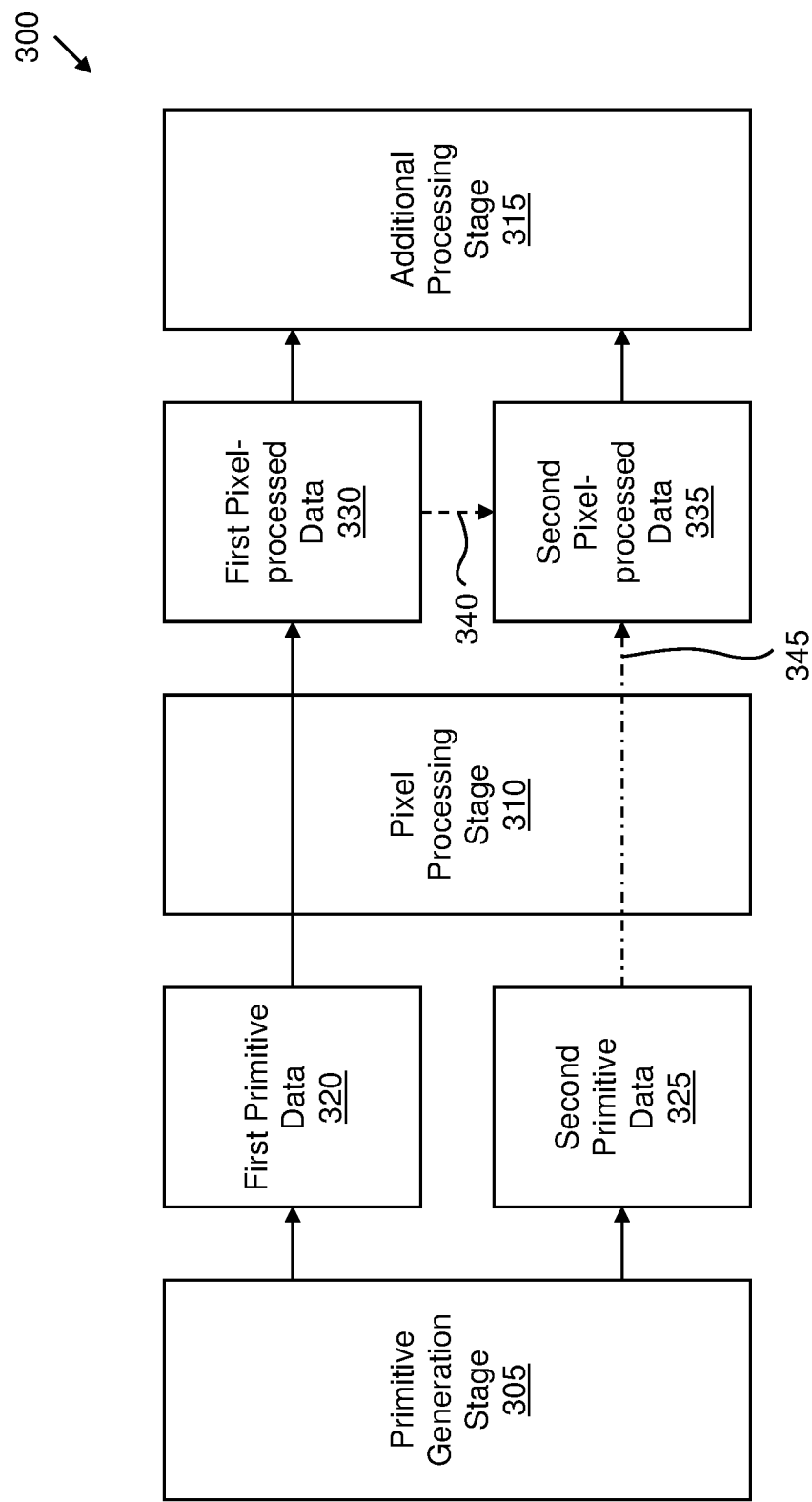
FIG. 3 shows schematically another example of a graphics processing pipeline in accordance with an embodiment.

Referring to FIG. 3, there is shown schematically an example of a graphics processing pipeline 300.

The processing conducted in the graphics processing pipeline 300 may be performed in a VR environment or context. One use case for GPU acceleration is in the rendering of VR applications. The graphics processing pipeline 300 may therefore be used to accelerate and/or enhance rendering of VR applications.

For example, where some or all of a scene is at an infinite distance with respect to the viewer of the scene, there is no parallax between the left eye view and the right eye view because any objects in the scene are a long distance from the camera position. Sky boxes, space backgrounds and other such painted backdrops are examples of portions of a scene that may be at an infinite distance with respect to the viewer. Rendering the same pixel twice for infinite distance objects, namely once for the left eye and once for the right eye, increases GPU workload, increases power consumption and increases latency with little or no benefit. Power consumption may be a particular consideration in battery-powered devices, such as smartphones, tablet computing devices, VR headsets etc. Latency may be a particular consideration in VR, since significant lags, for example between detecting viewer interaction with a scene and updating the view of the scene accordingly, can detract from user experience. Determining infinite distance regions of, and/or objects in, the scene and reducing those regions and/or objects to a single rendering operation may reduce such GPU redundancy. By accelerating and/or enhancing such rendering, rendering capacity may be freed up for other rendering operations. The techniques described herein may also result in reduced GPU power consumption by conducting fewer rendering operations.

The graphics processing pipeline 300 comprises an image processing pipeline comprising a primitive generation stage 305, a pixel processing stage 310 and an additional processing stage 315.

The primitive generation stage 305 processes input data to produce first primitive data 320 and second primitive data 325. The input data may comprise vertex attribute data for example. The primitive generation stage 305 may comprise one or more vertex shaders. Processing the input data in the primitive generation stage 305 may comprise performing vertex shading on the input data. The term 'primitive data' is used herein to mean data output by a primitive generation stage. The first primitive data 320 is associated with a first view of a scene and the second primitive data 325 is associated with a second view of the scene. The first view of the scene may be associated with a first eye of a viewer of the scene and the second eye may be associated with a second eye of the viewer of the scene. The first view of the scene may be associated with the left eye of a viewer of the scene and the second eye may be associated with the right eye of the viewer of the scene.

The first primitive data 320 is processed in the pixel processing stage 310 to produce first pixel-processed data 330. The pixel processing stage 310 may comprise one or more rasterizers and one or more fragment shaders. Processing the first primitive data 320 in the pixel processing stage 310 may comprise performing rasterization and/or vertex-shading on the first primitive data 320. The term 'pixel-processed data' is used herein to mean data output by a pixel processing stage. The first pixel-processed data 330 is associated with the first view of the scene.

In this example, a determination is made for, or in relation to, second pixel-processed data 335 associated with the second view of the scene. The determination is whether to use the first pixel-processed data 330 as the second pixel-processed data 335 or whether to process the second primitive data 325 in the pixel processing stage 310 to produce the second pixel-processed data 335. The determination may be made in the primitive generation stage 305, in the pixel processing stage 310 or elsewhere, for example in one or more stages intermediate the primitive generation stage 305 and the pixel processing stage 310. The determination may be made by analyzing the first primitive data 320 and/or the second primitive data 325 and/or the first pixel-processed data 330 and/or one or more other data items. In some examples, the determination for the second pixel-processed data 335 is made before the first primitive data 320 is processed in the pixel processing stage 310 to produce the first pixel-processed data 330. In other examples, the determination for the second pixel-processed data 335 is made after the first primitive data 320 is processed in the pixel processing stage 310 to produce the first pixel-processed data 330.

In some examples, the determination for the second pixel-processed data 335 is made by comparing the first primitive data 320 to the second primitive data 325, for example to assess a degree of similarity between the first primitive data 320 and the second primitive data 325. In other examples, the determination for the second pixel-processed data 335 is made by inspecting data comprising an indication of a degree of similarity between the first primitive data 320 and the second primitive data 325. The data comprising the indication of a degree of similarity may be binary in that it may indicate whether or not the first primitive data 320 and the second primitive data 325 are sufficiently similar such that the first pixel-processed data 330 can be used as the second pixel-processed data 335. The data comprising the indication of the degree of similarity may be generated by an entity or process in the graphics processing pipeline 300 that is different from the entity or process that makes the determination for the second pixel-processed data 335. For example, the determination for the second pixel-processed data 335 may be made in the pixel processing stage 310 and the data comprising the indication of a degree of similarity may be generated in the primitive generation stage 305 or in one or more stages intermediate the primitive generation stage 305 and the pixel processing stage 310.

In some examples, it is determined that the first pixel-processed data 330 is to be used as the second pixel-processed data 335. In such examples, the first pixel-processed data 330 is used as the second pixel-processed data 335, as indicated by dashed arrow 340.

In some examples, using the first pixel-processed data 330 as the second pixel-processed data 335 comprises writing the first pixel-processed data 330 to one or more memory locations associated with the first view, reading the first pixel-processed data 330 from the one or more memory locations associated with the first view and writing the first pixel-processed data 330 to one or more memory locations associated with the second view.

Writing the first pixel-processed data 330 to the one or more memory locations associated with the first view may comprise generating header data and payload data and storing the header data and the payload data in one or more memory locations associated with the first view. The header data may point to the payload data and may be stored in one or more parts of the one or more memory locations associated with the first view that are different from one or more parts of the one or more memory locations associated with the first view in which the payload data is stored.

Figure 4:
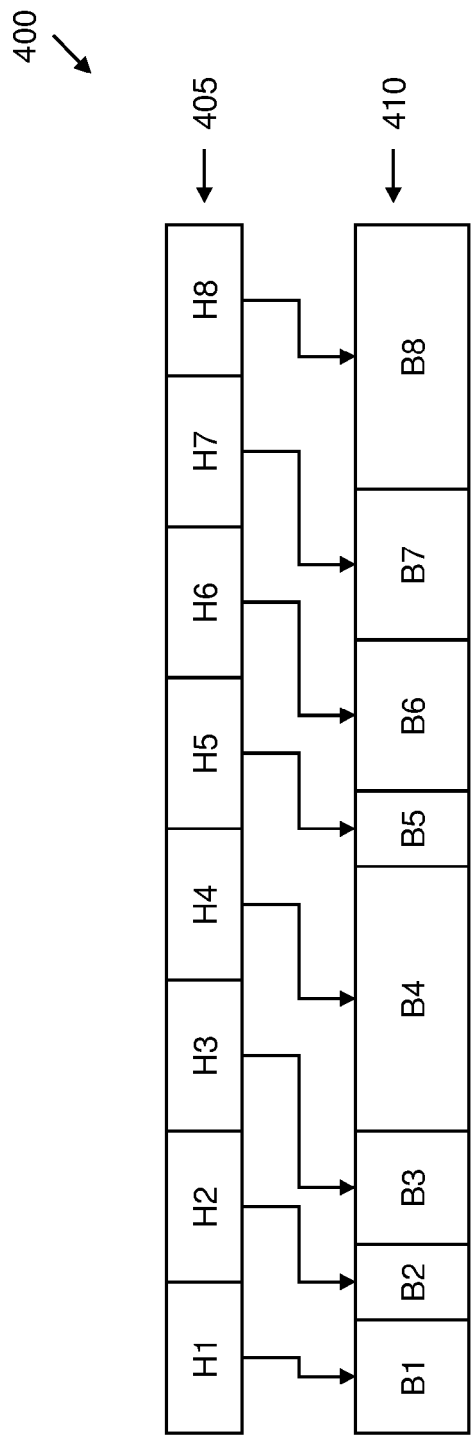
FIG. 4 shows schematically an example of a data storage arrangement in accordance with an embodiment.

Referring to FIG. 4, there is shown schematically an example of a data storage arrangement 400. In this example, header data 405 points to payload data 410. For example, first header data, H1, points to corresponding first payload data, B1, second header data, H2, points to corresponding second payload data, B2, and so on.

Returning now to FIG. 3, reading the first pixel-processed data 330 from the one or more memory locations associated with the first view may comprise identifying the header data associated with the first pixel-processed data 330 and then accessing the payload data based on the pointer in the header data. Identifying the header data associated with the first pixel-processed data 330 may be based on a logical position of the first pixel-processed data 330 in relation to the first view. For example, where the first pixel-processed data 330 corresponds to a tile in the output of the graphics processing pipeline 300, the position of the corresponding tile in the output may map to the memory location(s) in which the header data is stored. Likewise, other pixel-processed data associated with the first view corresponding to tiles in the output may map to the memory location(s) in which their associated header data is stored.

Writing the first pixel-processed data 330 to one or more memory locations associated with the second view may comprise generating header data and payload data and storing the header data and the payload data in one or more memory locations associated with the second view. The header data may point to the payload data and may be stored in one or more parts of the one or more memory locations associated with the second view that are different from one or more parts of the one or more memory locations associated with the second view in which the payload data is stored.

As such, the first pixel-processed data 330 is, in effect, reused as the second pixel-processed data 335.

In some examples, the one or more memory locations associated with the first view and the one or more memory locations associated with the second view are sequential, or at least partly sequential, in memory. This facilitates relatively efficient memory access, compared to the one or more memory locations associated with the first view and the one or more memory locations associated with the second view being non-sequential in memory. Owing to pixel shuffling, pixels may not strictly be in sequential order in terms of original pixel-level coordinates when stored in sequential memory locations. For example, sequential memory access in Synchronous Dynamic Random-Access Memory (SDRAM) and Double Data Rate SDRAM (DDR SDRAM) is more efficient than non-sequential access. Caching in translation lookaside buffers (TLBs) may also be improved since the stored data has a better locality in memory management unit (MMU) pages.

However, in the examples described above, the first pixel-processed data 330 is still written to one or more memory locations, read from the one or more memory locations, and then written to one or more other memory locations.

In other examples, using the first pixel-processed data 330 as the second pixel-processed data 335 comprises writing the first pixel-processed data 330 to one or more memory locations associated with the first view, generating data comprising a pointer to the one or more memory locations associated with the first view and storing the data comprising the pointer in one or more memory locations associated with the second view.

Writing the first pixel-processed data 330 to the one or more memory locations associated with the first view may be conducted as above by generating header data and payload data and storing the header data and the payload data in one or more memory locations associated with the first view.

However, rather than reading the first pixel-processed data 330 from the one or more memory locations associated with the first view and writing the first pixel-processed data 330 to the one or more memory locations associated with the second view, further header data, associated with the second view, may be generated and stored in one or more memory locations associated with the second view. The further header data may point to the existing payload data associated with the first pixel-processed data 330, or may point to the header data associated with the existing payload data associated with the first pixel-processed data 330, in the memory location(s) associated with the first view. As such, payload data associated with the first pixel-processed data 330 is written once to the memory location(s) associated with the first view and is not read and re-written to the memory location(s) associated with the second view. This saves the associated read and write operations. The payload data associated with the first pixel-processed data 330 is thus associated with two different pointers, namely one in header data stored in the memory location(s) associated with the first view and one in header data stored in the memory location(s) associated with the second view. The first pixel-processed data 330 may be read using the header data stored in the memory location(s) associated with the second view when needed.

Figure 5:
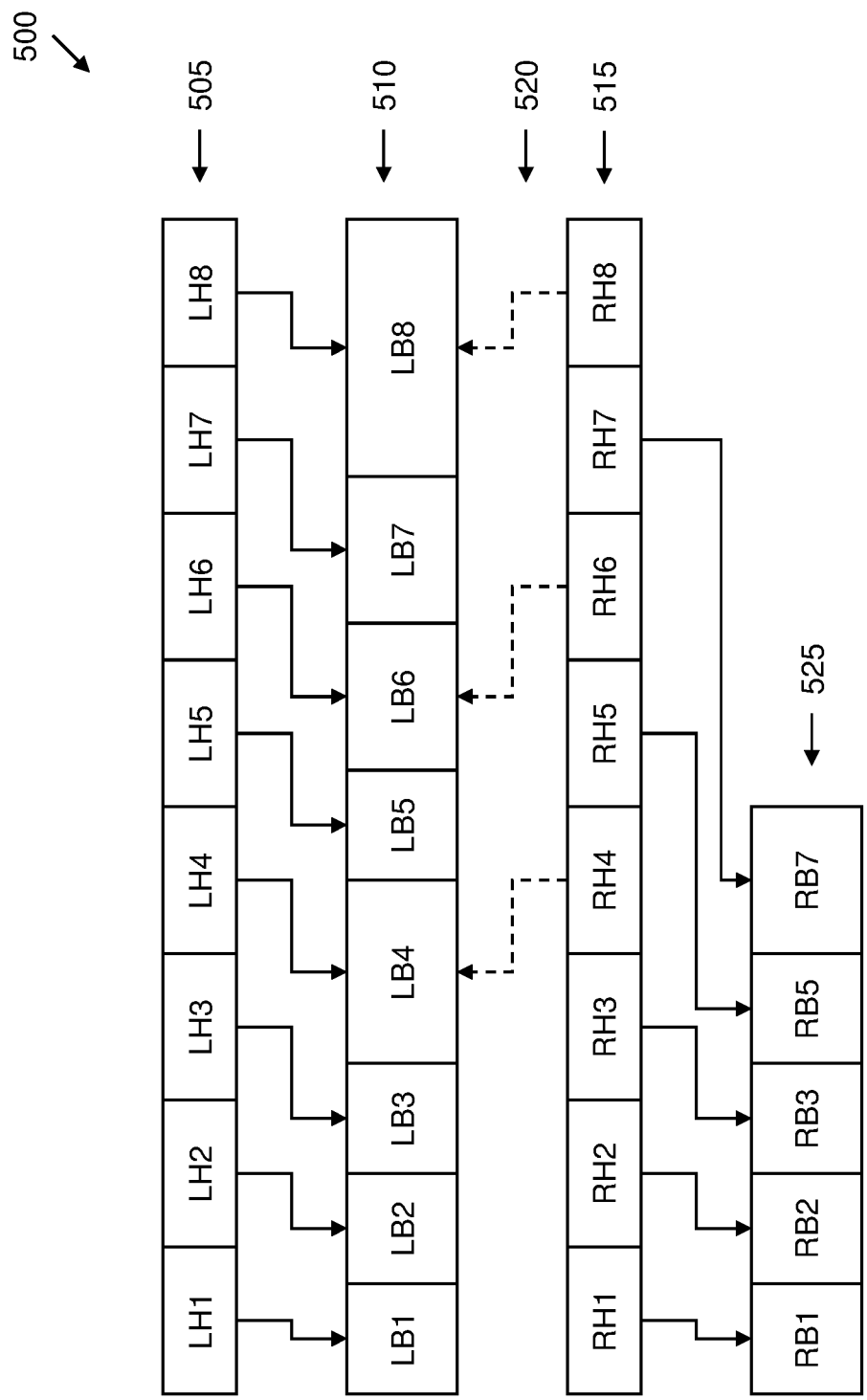
FIG. 5 shows schematically another example of a data storage arrangement in accordance with an embodiment.

Referring to FIG. 5, there is shown schematically an example of a data storage arrangement 500. In this example, header data 505 associated with a first view points to payload data 510 associated with the first view. For example, first header data associated with the first view, LH1, points to corresponding first payload data associated with the first view, LB1, second header data associated with the first view, LH2, points to corresponding second payload data associated with the first view, LB2, and so on.

In this example, some header data 515 associated with a second view points to payload data 510 associated with the first view, as indicated by dashed arrows 520. In this example, the arrows 520 indicate shared payload references. For example, fourth header data associated with the second view, RH4, points to corresponding fourth payload data associated with the first view, LB4, and sixth header data associated with the second view, RH6, points to corresponding sixth payload data associated with the first view, LB6.

Further, in this example, other header data 515 associated with the second view points to payload data 525 associated with the second view. For example, first header data associated with the second view, RH1, points to first payload data associated with the second view, RB1, and seventh header data associated with the second view, RH7, points to corresponding seventh payload data associated with the second view, RB7. Returning now to FIG. 3, in some examples, where the first primitive data 320 is used as the second pixel-processed data 335, the second primitive data 325 is not processed in the pixel processing stage 310 to produce the second pixel-processed data 335. As such, the overhead associated with processing of the second primitive data 325 in the pixel processing stage 310 to produce the second pixel-processed data 335 is bypassed.

In other examples, it is determined that the second primitive data 325 is to be processed in the pixel processing stage 310 to produce the second pixel-processed data 335. In such examples, the first primitive data 320 is not used as the second pixel-processed data 335. Instead, in such examples, the second primitive data 325 is processed in the pixel processing stage 310 to produce the second pixel-processed data 335, as indicated by dash-dot arrow 345.

In some examples, the determination for the second pixel-processed data 335 is based on one or more geometric properties of the first primitive data 320 and/or one or more geometric properties of the second primitive data 325.

The first primitive data 320 and/or the second primitive data 325 comprise data identifying, describing and/or defining one or more primitives. The first primitive data 320 and/or the second primitive data 325 may be comprised in a common (or 'shared') multiview tile list, although, and as will be described below, they could be comprised in separate tile lists in non-multiview arrangements. The one or more geometric properties may relate to the one or more primitives identified, described and/or defined in the first primitive data 320 and/or the second primitive data 325.

In some examples, the one or more geometric properties include a property of one of the first primitive data 320 and the second primitive data 325 relative to a property of the other of the first primitive data 320 and the second primitive data 325. Such a property may be considered to be a relative geometric property in the sense that it is based on both the first primitive data 320 and the second primitive data 325. This is in contrast to an absolute property which would be based on one or the other, but not both, of the first primitive data 320 and the second primitive data 325. Making use of a relative property may facilitate identifying the one or more geometric properties where, for example, the entity or process performing such identification has access to both the first primitive data 320 and the second primitive data 325. This may be the case where, for example, multiview processing is available.

In some examples, the one or more geometric properties include a predetermined parallax property. A parallax property is an example of a relative geometric property, in that a measure of parallax is determined using information from both the first primitive data 320 and the second primitive data 325. Having the predetermined parallax property may mean that the parallax between any primitives in the first primitive data 320 and the second primitive data 325 is zero or is sufficiently small that there is no difference between the primitives in the first primitive data 320 and the second primitive data 325, or that any differences are sufficiently small that using the first pixel-processed data 330 as the second pixel-processed data 335 would still result in an acceptable representation of the scene and would not detract from user experience.

In some examples, determining that the first pixel-processed data 330 is to be used as the second pixel-processed data 335 is in response to identifying that the first primitive data 320 and the second primitive 325 data have the predetermined parallax property. Where the first primitive data 320 and the second primitive data 325 have the predetermined parallax property, the second pixel-processed data 335 produced by processing the second primitive data 325 in the pixel processing stage 310 would be the same or substantially the same as the first pixel-processed data 330. As such, the first pixel-processed data 330 is used as the second pixel-processed data 335.

In some examples, determining that the second primitive data 325 is to be processed in the pixel processing stage 320 to produce the second pixel-processed data 335 is in response to identifying that the first primitive data 320 and the second primitive data 325 do not have the predetermined parallax property. Where the first primitive data 320 and the second primitive data 325 do not have the predetermined parallax property, second pixel-processed data 335 produced by processing the second primitive data 325 in the pixel processing stage 310 would not be the same as, or sufficiently similar to, the first pixel-processed data 330. As such, the first pixel-processed data 330 is not used as the second pixel-processed data 335, but the second primitive data 325 is processed in the pixel processing stage 310 to produce the second pixel-processed data 335.

In some examples, identifying whether the first primitive data 320 and the second primitive data 325 have the predetermined parallax property is based on a measure of parallax associated with any primitives in the first primitive data 320 and any corresponding primitives in the second primitive data 325. As indicated above, the measure of parallax may indicate the extent to which the first pixel-processed data 330 can be used as the second pixel-processed data 335.

In some examples, the identifying of whether the first primitive data 320 and the second primitive data 325 have the predetermined parallax property is based on comparing positions of vertices of primitives in the first primitive data 320 with positions of corresponding vertices of corresponding primitives in the second primitive data 325. This facilitates determination of whether or not the first primitive data 320 and the second primitive data 325 have the predetermined parallax property.

In some examples, identifying that the first primitive data 320 and the second primitive data 325 have the predetermined parallax property is in response to determining that one or more offsets between the positions of the vertices of the primitives in the first primitive data 320 and the positions of the corresponding vertices of the corresponding primitives in the second primitive data 325 do not exceed one or more predetermined offset thresholds.

A predetermined offset threshold may be used to indicate an allowable degree or measure of similarity below which the first primitive data 320 and the second primitive data 325 can be considered to be sufficiently similar such that the first pixel-processed data 330 can be used as the second pixel-processed data 335.

In some examples, the predetermined offset threshold is zero. Such examples require that there is no offset between the primitives in the first primitive data 320 and the second primitive data 325. This may indicate that any such primitives are all at an infinite distance from the viewer of the scene and therefore that the first pixel-processed data 330 can be used as the second pixel-processed data 335.

In some examples, the predetermined offset threshold is non-zero. Such examples allow for some offset between the primitives in the first primitive data 320 and the second primitive data 325. This may indicate that any such primitives are all substantially at an infinite distance from the viewer of the scene, or are sufficiently far away from the viewer that the first pixel-processed data 330 can be used as the second pixel-processed data 335.

In some examples, the predetermined offset threshold is a predetermined error margin offset threshold, selected to account for vertex snapping. Even where the predetermined error margin offset is non-zero, it may be possible to use the first pixel-processed data 330 as the second pixel-processed data 335 where vertex positions all snap to the same sub-pixel location, for example where the graphics API uses vertex snapping.

In some examples, the predetermined offset threshold is a predetermined interocular offset threshold, selected to account for interocular shift. In some examples, emulation may be performed to determine whether there is interocular shift, in other words whether a separation between primitives is as a result of interocular separation rather than as a result of the primitives not being at infinite distance. The interocular separation may correspond to a fixed offset for a coordinate of one view relative to the other view, given the device or scene camera setup.

When determining similarity, the predetermined interocular offset threshold may be used first and the predetermined error margin offset threshold may be used subsequently. The predetermined interocular offset threshold for similarity may for example correspond to multiple pixels and the predetermined error margin offset threshold for similarity may be smaller, for example at the sub-pixel level.

In some examples, the one or more geometric properties include an absolute property of the first primitive data 320 and/or the second primitive data 325. The geometric property may be absolute in the sense that it can be identified by inspecting the first primitive data 320 and/or the second primitive data 325 without reference to the other of the first primitive data 320 and/or the second primitive data 325. For example, it may be determined whether the first primitive data 320 has the absolute property by inspecting the first primitive data 320 and not inspecting the second primitive data 325. This may facilitate identification of the one or more geometric properties where, for example, the entity or process performing such identification does not have access to both the first primitive data 320 and the second primitive data 325. This may be the case where, for example, multi-view processing is not available or is not enabled.

In some examples, the one or more geometric properties include an infinite distance property. The infinite distance property may concern the extent to which one or more geometric properties identified, described and/or defined in the first primitive data 320 and/or one or more geometric properties identified, described and/or defined in the second primitive data 325 may be considered to be sufficiently far from the viewer that where any such primitives exist in both views, they would have zero parallax or a sufficiently small parallax that they only need to be rendered once.

In some examples, determining that the first pixel-processed data 320 is to be used as the second pixel-processed data 335 is in response to identifying that the first primitive data 320 and the second primitive data 325 both have the infinite distance property. Where the first primitive data 320 and the second primitive data 325 both have the infinite distance property, the second pixel-processed data 335 produced by processing the second primitive data 325 in the pixel processing stage 310 would be the same as the first pixel-processed data 330. As such, the first pixel-processed data 330 is used as the second pixel-processed data 335.

In some examples, determining that the second primitive data 325 is to be processed in the pixel processing stage 310 to produce the second pixel-processed data 335 is in response to identifying that one or both of the first primitive data 320 and the second primitive data 325 do not have the infinite distance property. Where one or both of the first primitive data 320 and the second primitive data 325 do not have the infinite distance property, second pixel-processed data 335 produced by processing the second primitive data 325 in the pixel processing stage 310 would not be the same as the first pixel-processed data 330. As such, the first pixel-processed data 330 is not used as the second pixel-processed data 335, but the second primitive data 325 is processed in the pixel processing stage 310 to produce the second pixel-processed data 335.

In some examples, identifying that the first primitive data 320 and/or the second primitive data 325 has the infinite distance property is in response to determining that a clip-space Z value associated with one or more primitives in the first primitive data 320 and/or a clip-space Z value associated with one or more primitives in the second primitive 325 data exceeds a predetermined clip-space Z value threshold. In such examples, the one or more primitives may be considered to be sufficiently far from the viewer that they can be treated as being at an infinite distance from the viewer. In some examples, the predetermined clip-space Z value threshold is user-configurable in that it may be set, configured or defined by a user, for example by a graphics processing system operator and/or a content creator and/or the viewer. For example, the predetermined clip-space Z value threshold may be set based on a desired degree of similarity such that all primitives beyond the predetermined clip-space Z value threshold are considered to be the same. In other examples, the predetermined clip-space Z value threshold is set automatically.

In some examples, the one or more geometric properties of the first primitive data 320 and/or one or more geometric properties of the second primitive data 325 include a geometric similarity property. The geometric similarity property may concern the measure, or extent, of geometric similarity between one or more primitives identified, described and/or defined in the first primitive data 320 and/or one or more primitives identified, described and/or defined in the second primitive data 325. The measure of geometric similarity may be associated with size, shape, orientation, position, type, etc. of primitives.

Determining that the first pixel-processed data 330 is to be used as the second pixel-processed data 335 may be in response to identifying that any primitives in the first primitive data 320 are the same or substantially the same as any primitives in the second primitive data 325. Where any primitives in the first primitive data 320 are the same as any primitives in the second primitive data 325, second pixel-processed data 335 produced by processing the second primitive data 325 in the pixel processing stage 310 would be the same as the first pixel-processed data 330. As such, the first pixel-processed data 330 is used as the second pixel-processed data 335. Primitives in the first primitive data 320 may be considered to be substantially the same as primitives in the second primitive data 325 where the viewer would not notice use of any primitives in one of the first primitive data 320 and the second primitive data 325 instead of any primitives in the other of the first primitive data 320 and the second primitive data 325. This saves on the overhead associated with producing the second pixel-processed data 335 by unnecessarily processing the second primitive data 325 in the pixel processing stage 310.

Determining that the second primitive data 325 is to be processed in the pixel processing stage 310 to produce the second pixel-processed data 335 may be in response to identifying that one or both of the first primitive data 320 and the second primitive data 325 have at least one primitive that is not the same or substantially the same as a primitive in the other of the first primitive data 320 and the second primitive data 325. Where at least one primitive in the first primitive data 320 is not the same, or substantially the same, as a primitive in the second primitive data 325, second pixel-processed data 335 produced by processing the second primitive data 325 in the pixel processing stage 310 would not be the same as the first pixel-processed data 330. As such, the first pixel-processed data 330 is not used as the second pixel-processed data 335, but the second primitive data 325 is processed in the pixel processing stage 310 to produce the second pixel-processed data 335.

In some examples, identifying whether the first primitive data 320 has the geometric properties and/or whether the second primitive data 325 has the geometric properties is based on a geometric property indicator associated with the first primitive data 320 and/or a geometric property indicator associated with the second primitive data 325. The geometric property indicator(s) may indicate whether the first primitive data 320 and/or the second primitive data 325 has the predetermined parallax property, the infinite distance property and/or the geometric similarity property. The geometric property indicator(s) may be generated by an entity or process other than an entity or process that makes the determination for the second pixel-processed data 335. The geometric property indicator(s) may be stored in one or more tile lists. One or more geometric property indicators associated with the first view may be stored in one or more tile lists associated with the first view and one or more geometric property indicators associated with the second view may be stored in one or more separate tile lists associated with the second view. Alternatively or additionally, one or more geometric property indicators associated with the first view and one or more geometric property indicators associated with the second view may be stored in a common (or 'shared') multiview tile list associated with both the first and second views.

In some examples, a value of the geometric property indicator(s) is user-configurable. For example, the value may be set by a user by manual annotation by a graphics processing system operator and/or a graphics content creator and/or a viewer. In other examples, a value of the infinite distance property indicator(s) is set automatically.

Additional processing is performed in the graphics processing pipeline 300, in the additional processing stage 315, based on the result of the determination for the second pixel-processed data 335. An example of additional processing is write-out to one or more memory locations. The one or more memory locations may be in one or more buffers. The one or more buffers may be in one or more framebuffers.

In some examples, for example where tile-based rendering is performed, the first primitive data 320 is associated with a sub-region of the first view and the second primitive data 325 is associated with a corresponding sub-region of the second view. The sub-regions may correspond to tiles as described above. For example, each tile may be 16×16 pixels in size. The tiles, collectively, form a regular grid or array corresponding to the overall image to be output. The GPU may render each tile individually, rather than rendering a full image in its entirety. This allows the GPU to render tile-wise to an on-chip memory, rather than rendering to external, off-chip memory. When rendering is complete for a given tile, the tile can be written to the off-chip memory and the next tile rendered by the GPU into its on-chip memory. Multiple graphics processing pipelines can be used in parallel to perform parallel rendering of tiles.

In other examples, the first primitive data 320 is associated with the entire first view and the second primitive data 325 is associated with the entire second view. This may be the case where tile-based rendering is not used and where the first and second views are processed in their entirety.

In some examples, further first primitive data is associated with at least one further sub-region of the first view and further second primitive data is associated with at least one corresponding further sub-region of the second view. The further sub-region may correspond to further tiles.

In some examples, the further first primitive data is processed in the pixel processing stage 310 to produce further first pixel-processed data associated with the first view. For further second pixel-processed data associated with the second view, a determination is made whether to use the further first pixel-processed data as the further second pixel-processed data or whether to process the further second primitive data in the pixel processing stage 310 to produce the further second pixel-processed data. As such, the determination may be made on a tile-by-tile basis. For example, it may be determined that, for some tiles, the further first pixel-processed data can be used the further second pixel-processed data and that, for other tiles, the further second primitive data should be processed the pixel processing stage 310 to produce the further second pixel-processed data.

In some examples, processing alternates between processing data associated with the first view and processing data associated with the second view. For example, a tile associated with the first view may be processed, followed by a tile associated with the second view, followed then by a tile associated with the first view etc. Such alternating (or 'interleaved') processing may continue until all tiles associated with a scene have been processed. Such alternating processing may relate to primitive processing, pixel processing and/or additional processing.

In some examples, all first primitive data associated with the first view is processed in the pixel processing stage 310 to produce all first pixel-processed data associated with the first view. For example, where tile-based rendering is used, all tiles associated with the first view may be processed in the pixel processing stage 310 to produce all first pixel-processed data associated with the first view.

Figure 6:
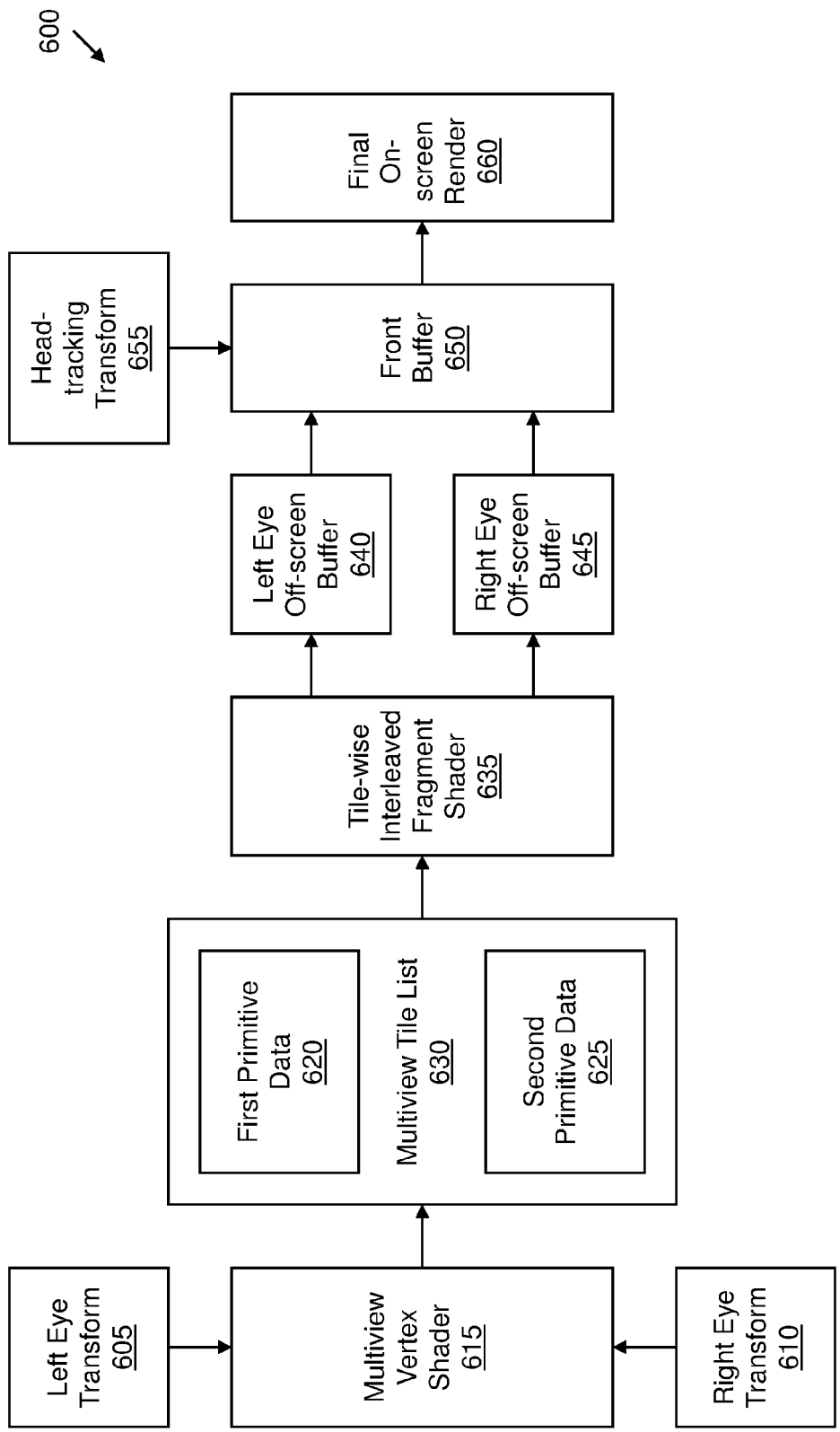
FIG. 6 shows schematically another example of a graphics processing pipeline in accordance with an embodiment.

Referring to FIG. 6, there is shown schematically an example of a graphics processing pipeline 600.

In this example, the graphics processing pipeline 600 uses multiview processing to concurrently perform vertex shading for the first and second views. In this example, the first view is associated with a left eye of a viewer and the second view is associated with a right eye of the viewer. In this example, the graphics processing pipeline 600 uses tile-based rendering in which rendering is performed on a tile-by-tile basis, as described above.

In this example, the graphics processing pipeline 600 uses a multiview-enabled tile list data structure to provide primitive data to the GPU. The multiview shading and tiling processes have concurrent visibility of primitives, for example triangles, in the left eye and right eye views. It can therefore be determined whether such primitives can be rendered for the left eye and the rendered data used for the right eye or whether such primitives should be rendered separately for both the left and right eye. This determination may be dependent on one or more of the geometric properties described above, for example a predetermined parallax property, an infinite distance property and/or a geometric similarity property. Rendering only when needed can save duplicate fragment shader core processing cost associated with processing identical primitives.

In this example, left eye transform data 605 and right eye transform data 610 are provided to a multiview vertex shader 615. The left eye transform data 605 and the right eye transform data 610 may be used to construct the left eye view and the right eye view of the scene. The multiview vertex shader 615 may for example receive one vertex data stream and two matrix streams, one of the matrix streams being associated with the left eye and the other of the matrix streams being associated with the right eye. The multiview vertex shader 615 may generate data for the left eye view using the vertex data stream and the matrix associated with the left eye and may generate data for the right eye view using the same vertex data stream and the matrix associated with the right eye.

The multiview vertex shader 615 performs multiview vertex shading in a multiview vertex shading stage. A multiview vertex shading stage is an example of a primitive generation stage. In this example, multiview vertex shading comprises performing one or more multiview processing operations in which the first primitive data 620 and the second primitive data 625 are produced concurrently. The multiview vertex shader 615 has concurrent visibility of the primitives, for example polygons, in both the first primitive data 620 and the second primitive data 625.

In this example, the first primitive data 620 and the second primitive data 625 are comprised in a multiview data structure 630. In this example, the multiview data structure 630 is a multiview tile list. The multiview tile list may be generated by a tiler in the primitive generation stage.

The multiview vertex shader 615, and/or another entity or process, may determine whether, for example, a primitive in the first primitive data 620 and a corresponding primitive in the second primitive data 625 are zero parallax such that first pixel-processed data associated with the first view can be used as second pixel-processed data associated with the second view. This may involve, for example, determining whether the vertex positions of all vertices of all primitives in the first primitive data 620 are the same as, or are sufficiently similar to, all corresponding vertices of all corresponding primitives in the second primitive data 625.

The multiview tile list 630 may comprise one or more indicators indicative of whether first pixel-processed data can or should be used as second pixel-processed data or whether the second primitive data 625 should be processed in a pixel processing stage to produce the second pixel-processed data.

In this example, the pixel processing stage comprises a tile-wise interleaved fragment shader 635.

A single-bit indicator may be used. A bit value of 1 may indicate that the first pixel-processed data should be used as the second pixel-processed data. A bit value of 0 may indicate that the fragment shader 635 should process the second primitive data 625 to produce the second pixel-processed data. The multiview vertex shader 615, and/or one or more other entities or processes, may set the value(s) of the indicator(s). The value(s) of the indicator(s) may start at an initial value indicating that the first pixel-processed data should be used as the second pixel-processed data, but may be set to another value where the second primitive data 625 should be processed in the pixel processing stage, for example by the fragment shader 635, to produce the second pixel-processed data.

The fragment shader 635 performs tile-wise, interleaved fragment shading in a fragment-shading stage. In this example, the fragment shader 635 proceeds to process the data in the multiview tile list 630 tile-wise. In this example, processing the data in a tile-wise manner involves processing data associated with the left eye and data associated with the right eye by alternating between them.

At each tile location, the fragment shader 635 reads all of the primitives for the respective tile location, for example polygons, from the multiview tile list 630. In this example, the fragment shader 635 renders only those primitives which are marked as visible in either the left eye only, or in both the left eye and the right eye.

The graphics processing pipeline 600 includes a set of buffers including a left eye off-screen buffer 640, a right eye off-screen buffer 645 and a front buffer 650. Off-screen buffers are also known as back buffers. A double-buffer arrangement, including both back and front buffers, supports double-buffering of images. Pixels are drawn to back buffers while the front buffers are displayed on a screen. When the image in the back buffers is ready for display, the content in the back buffers is copied to the front screen buffer and is displayed on the screen. Double-buffering may facilitate smoother image display.

In this example, the fragment shader 635 renders a tile associated with the left eye and writes the framebuffer contents for the left eye to the left eye off-screen buffer 640.

The fragment shader 635 determines, for the corresponding tile for the right eye, whether the bit value of the indicator for the tile is 1 or 0.

When the bit value of the indicator for the tile is 1, the left and right eyes see the same view. Fragment shading for the right eye is skipped entirely. Instead, the existing contents in the left eye off-screen frame buffer 640 associated with the tile are written to the right eye off-screen buffer 645.

When the bit value of the indicator for the tile is 0, the left and right eyes see different views. Fragment shading is performed for the right eye. The existing contents of the left eye off-screen frame buffer 640 associated with the tile are not written to the right eye off-screen buffer 645.

The contents from both the left eye off-screen frame buffer 640 and the right eye off-screen buffer 645 are copied to the front buffer 650 and a head-tracking transform 655 may be applied.

The contents of the front buffer 650 are then read and displayed as a final on-screen render 660.

The above-described approach, in which a determination can be made to write the content in the left eye off-screen buffer 640 to the right eye off-screen buffer 645 saves the duplicate fragment shader processing cost of fragment-shading identical tiles.

However, this approach may be enhanced or optimized further to save redundant framebuffer write bandwidth associated with writing the content from the left eye off-screen buffer 640 to the right eye off-screen buffer 650, for example using the ARM Frame Buffer Compression (AFBC) data format. AFBC stores data as a header block followed by a body block. The header block includes a pointer that stores an address offset to find the associated body block in memory. In this example, the left eye off-screen buffer 640 and the right eye off-screen buffer 645 are stored sequentially, or at least partially sequentially, in memory. The right eye header includes a pointer to one or more blocks of texture data stored in the left eye body block region where the two eyes see the same data. In some examples, the right eye header stores an exact offset into the left eye body block region. In other examples, the right eye header stores data, for example a single bit, indicating that an address offset is to be used. The address offset may be provided to a texture mapping unit, for example in or associated with the fragment shader 635, separately.

Figure 7:
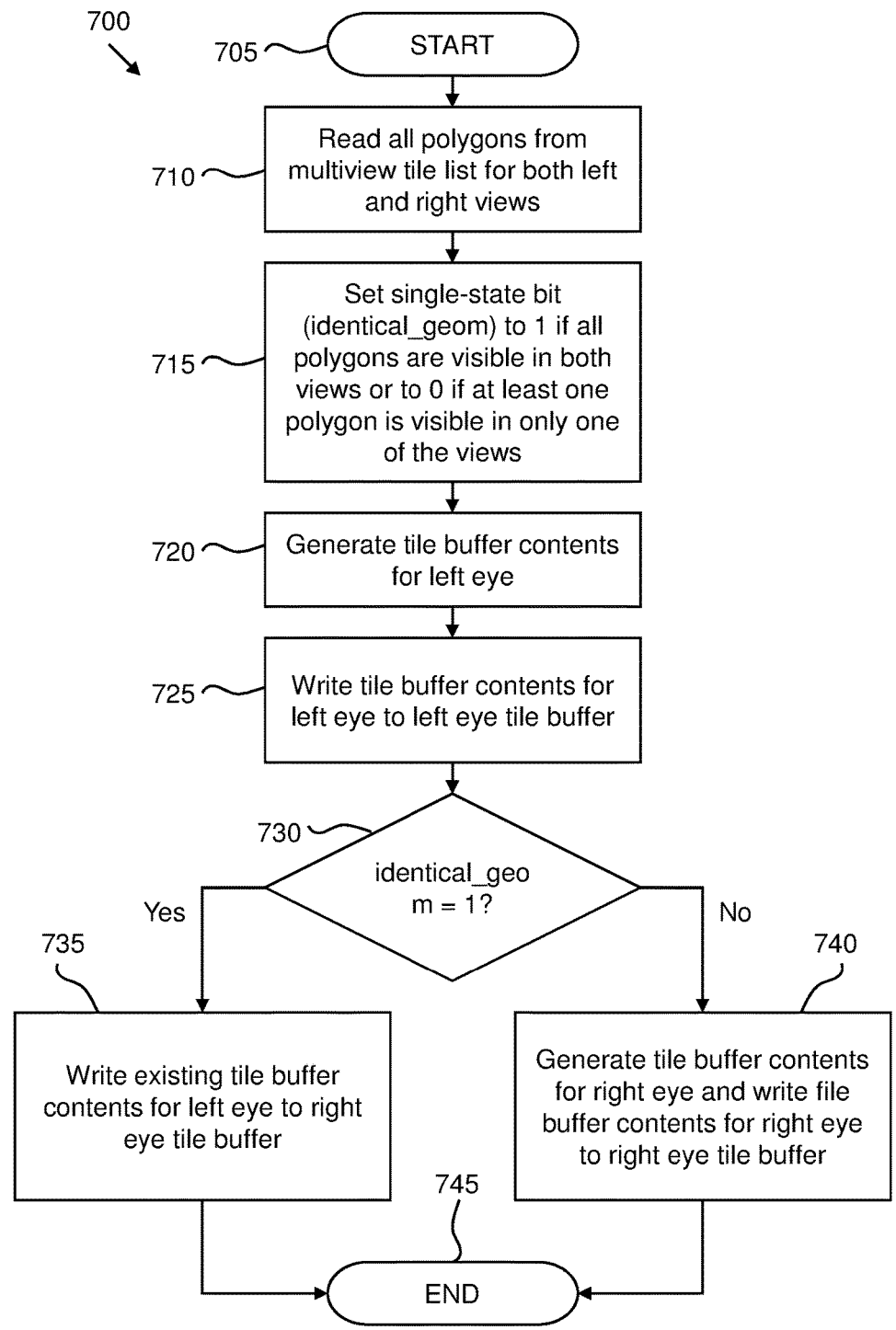
FIG. 7 shows a flowchart depicting an example of a method of operating a graphics processing system in accordance with an embodiment.

Referring to FIG. 7, there is shown an example of a method 700 of operating a graphics processing system. In this example, the graphics processing system comprises the graphics processing pipeline 600 described above with reference to FIG. 6.

At item 705, the method starts.

At item 710, all polygons are read from the multiview tile list 630 for both the left and right eye views.

At item 715, an indicator in the form of a single-state bit, labelled identical_geom, is set to have a value of 1 if all primitives are visible in both views or is set to have a value of 0 if at least one primitive is visible in only one of the views.

At item 720, tile buffer contents for the left eye are generated.

At item 725, the tile buffer contents for the left eye are written to the left eye off-screen buffer 640.

At item 725, it is determined whether the current value of the identical_geom indicator is equal to 1.

If it is determined, at item 725, that the current value of the identical_geom indicator is equal to 1, then, at item 735, the existing tile buffer contents for the left eye are written to the right eye off-screen buffer 645.

If it is determined, at item 725, that the current value of the identical_geom indicator is not equal to 0, then, at item 740, tile buffer contents for the right eye are generated from primitive data for the right eye and are written to the right eye off-screen buffer 645.

At item 745, following either item 735 or item 740, the method ends.

Figure 8A:
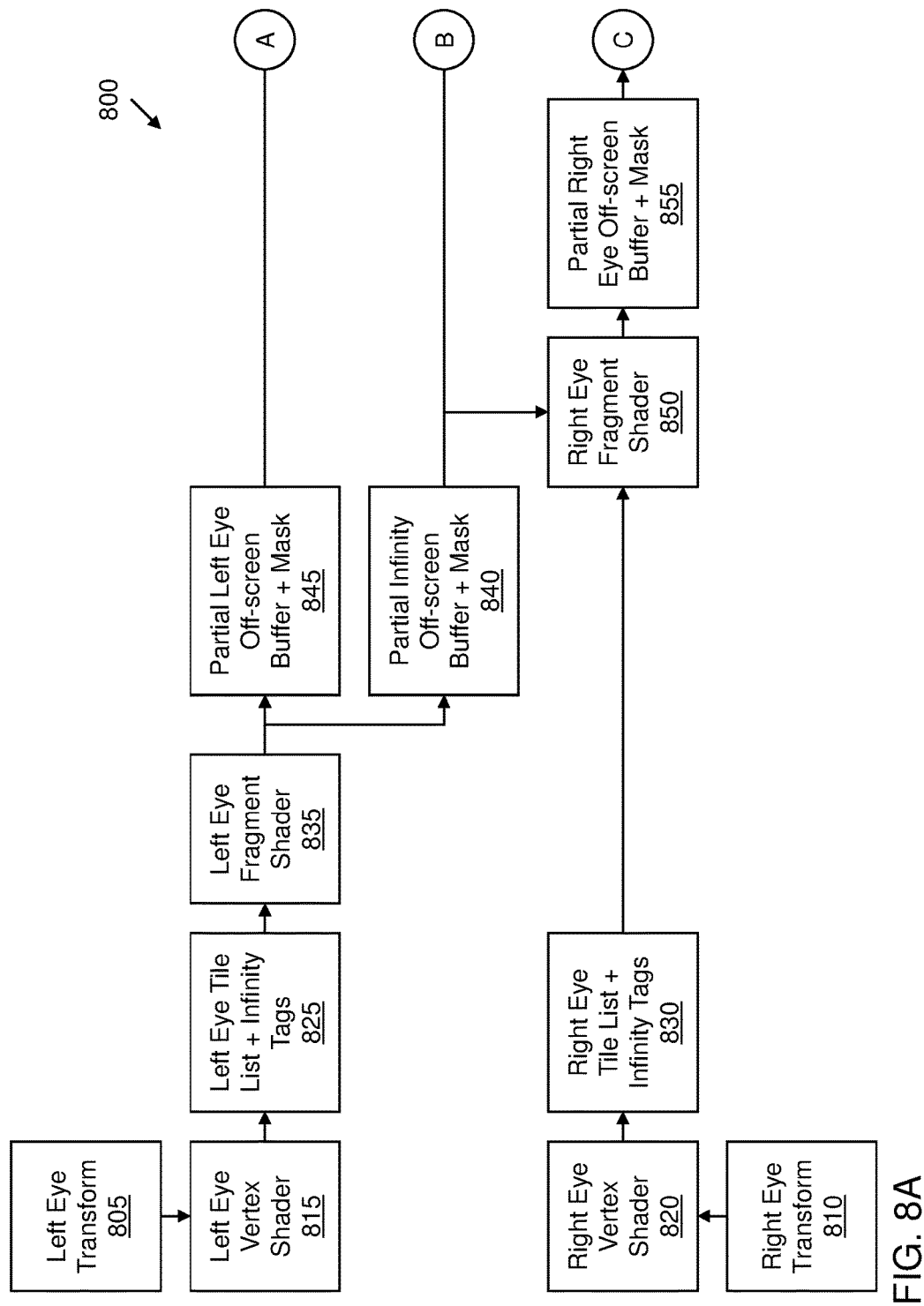
FIGS. 8A and 8B show schematically another example of a graphics processing pipeline in accordance with an embodiment.
Figure 8B:
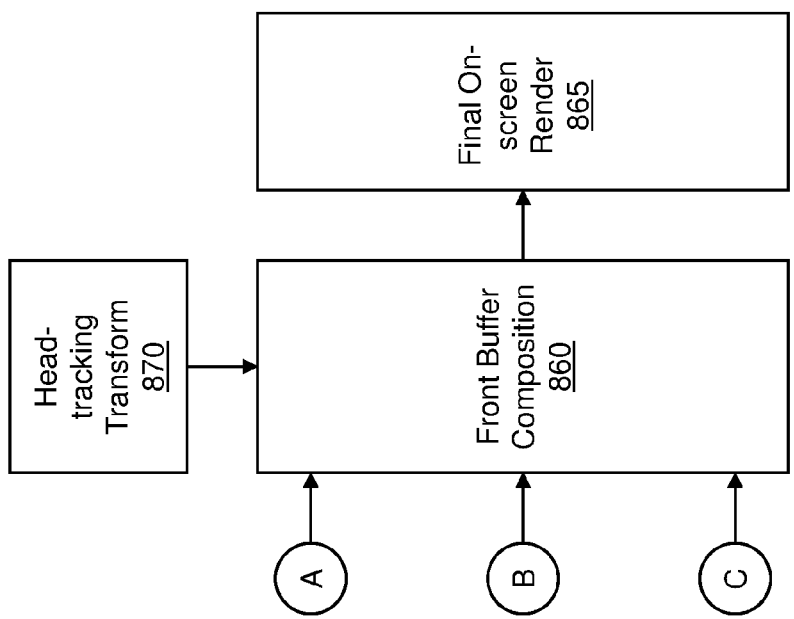

Referring to FIGS. 8A and 8B, there is shown schematically an example of a graphics processing pipeline 800.

The graphics processing pipeline 800 may be used in a graphics processing system which does not support the multiview tile processing features described above with reference to FIGS. 6 and 7 and which therefore processes the left and right views and buffers separately and independently.

In this example, left eye transform data 805 and right eye transform data 810 are provided to a left eye vertex shader 815 and a right eye vertex shader 820 respectively. A vertex-shading stage including both the left eye shader 815 and the right eye shader 820 is an example of a primitive generation stage.

The vertex-shading stage detects which primitives in the left eye view and the right eye view have an infinite distance property. In this example, the left eye vertex shader 815 detects which primitives in the left eye view have the infinite distance property and the right eye vertex shader 820 detects which primitives in the right eye view have the infinite distance property.

The output of the vertex-shading stage is a left eye tile list 825, which includes one or more indicators, and a right eye tile list 830, which also includes one or more indicators. In this example, the indicators are infinity tags, which indicate whether an associated tile has the infinite distance property. In this example, the left eye vertex shader 815 outputs the left eye tile list 825 with the one or more left eye infinity tags and the right eye vertex shader 820 outputs the right eye tile list 830 with the one or more right eye infinity tags.

The fragment-shading stage is adapted to read the infinity tags from the tile lists 825, 830 during rendering. The fragment-shading stage is also adapted to support writing tiles to either an eye-specific buffer, to a shared, infinity buffer or to discard the tile altogether. The tile may be discarded if it is already present in another buffer. The decision on which output buffer to write into depends on which eye is currently being rendered and the infinity tag states of the incoming primitives, which are rasterized into the current tile being rendered.

A left eye fragment shader 835 reads the left eye tile list and infinity tags 825. A right eye fragment shader 850 reads the right eye tile list and infinity tags 830.

If all of the primitives in a tile currently being inspected by the left eye fragment shader 835 are at infinity, the left eye fragment shader 835 renders the tile and writes the tile to a partial infinity off-screen buffer 840.

If at least one of the primitives in a tile currently being inspected by the left eye fragment shader 835 is not at infinity, the left eye fragment shader 835 renders the tile and writes the tile to a partial left eye off-screen buffer 845.

If all of the primitives in a tile currently being inspected by the right eye fragment shader 850 are at infinity and if the infinity off-screen buffer 840 contains the corresponding tile as a result of the left eye fragment shader 835 having written the tile to the infinity off-screen buffer 840, then the right eye fragment shader 850 does not render the tile. Instead, the tile is read from the infinity off-screen buffer 840.

If at least one of the primitives in a tile currently being inspected by the right eye fragment shader 850 is not at infinity, the right eye fragment shader 850 renders the tile and writes the tile to a partial right eye off-screen buffer 855.

Information identifying data stored in the infinity off-screen buffer 840, the left eye off-screen buffer 845 and/or the right eye off-screen buffer 855 may be stored. For example, metadata may be created and stored in the graphics processing pipeline 800 to track which tiles are written into which buffer. This allows the right eye processing stages to decide how to handle the right eye rendering, and final composition, to construct the final image.

A front buffer composition 860 is created using information in the infinity off-screen buffer 840, the left eye buffer 845 and/or the right eye buffer 855. This composition stage consumes the infinity off-screen buffer 840, the left eye buffer 845 and/or the right eye buffer 855 to write out a final on-screen render 865 for display. A head-tracking transform 870 may be used to form the front buffer composition 860.

The buffer pairs of, first, the infinity off-screen buffer 840 and the left eye buffer 845 and, second, the infinity off-screen buffer 840 and the right eye buffer 855 should be exposed as a single logical image to a texture mapper.

For uncompressed textures, the texture mapper may need additional logic or a MMU may need to be modified to assemble a single virtual image from disparate MMU pages. However, AFBC may be used to store each image as an array of headers, for example with one header per 16×16 tile. Each of the headers contains an address offset to a body block in a higher memory address. An array of AFBC headers may therefore be created for the logical left eye, which contains a set of address offsets, where each address offset is into either the infinity off-screen buffer 840 or the left eye buffer 845 depending on the buffer in which the associated data is stored. Similarly, an array of AFBC headers may be created for the logical right eye, which contains a set of address offsets, where each address offset is into either the infinity off-screen buffer 840 or the right eye buffer 855 depending on the buffer in which the associated data is stored. This allows three different buffers to be used to produce two logical images.

As such, the eye rendering stages produce sparsely populated body buffers for left, right and infinity data. The eye rendering stages also produce complete AFBC headers for the left eye and the right eye, allowing later stages to treat the textures as a single resource. The eye rendering stages also produce a coverage map for the infinity buffer, allowing the second eye rendering stage to determine whether or not an "at infinity" tile has already been rendered or not.

Figure 9:
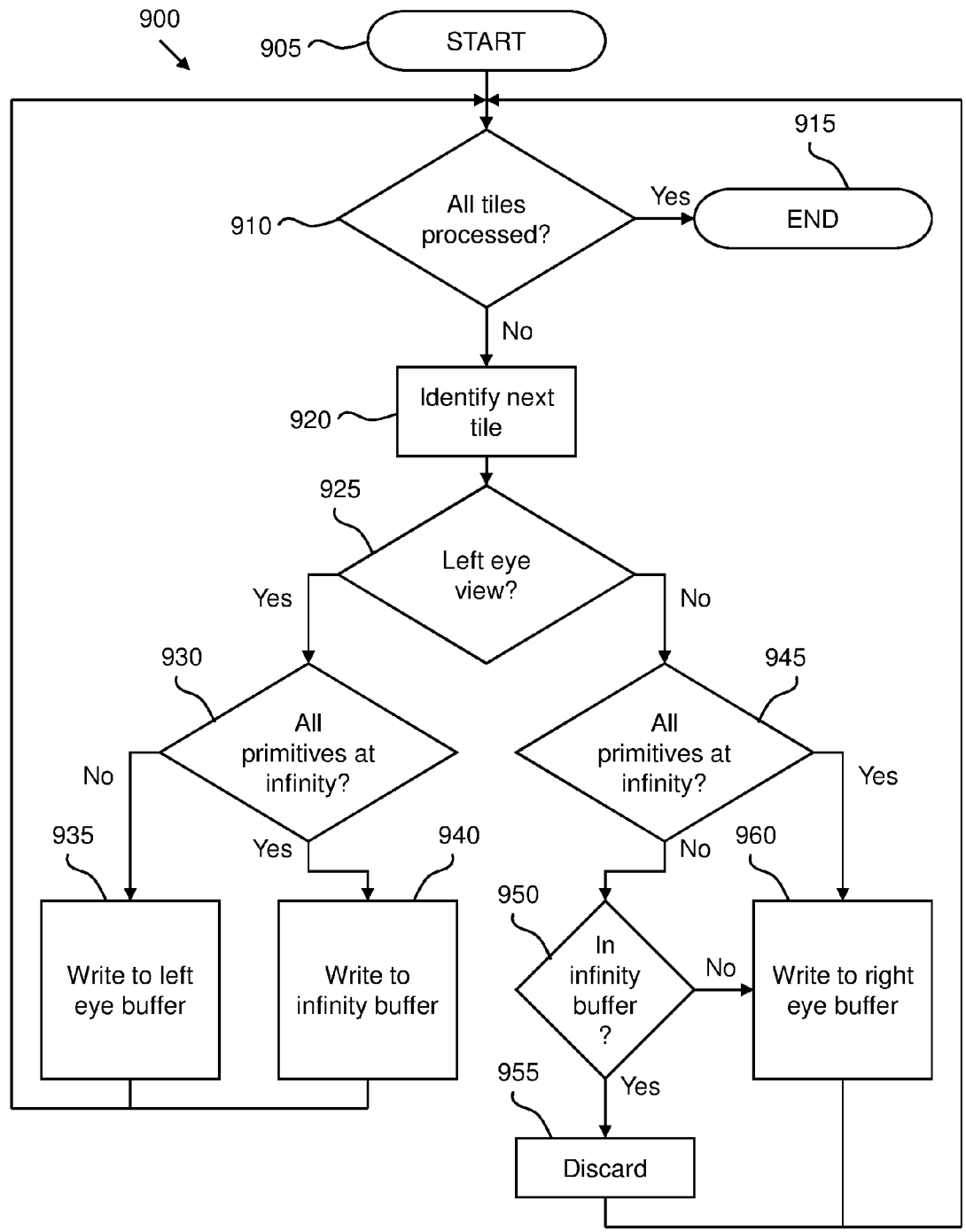
FIG. 9 shows a flowchart depicting another example of a method of operating a graphics processing system in accordance with an embodiment.

Referring to FIG. 9, there is shown an example of a method 900 of operating a graphics processing system. In this example, the graphics processing system comprises the graphics processing pipeline 900 described above with reference to FIG. 8.

At item 905, the method starts.

At item 910, it is determined whether all tiles associated with the left eye view and the right eye view have been processed.

If it is determined, at item 910, that all tiles associated with the left eye view and the right eye view have been processed, then processing ends at item 915.

If it is determined, at item 910, that not all tiles associated with the left eye view and the right eye view have been processed, then the next tile to be processed is identified at item 920.

At item 925, it is determined whether the current tile being processed is associated with the left eye view.

If it is determined, at item 925, that the current tile being processed is associated with the left eye view, then it is determined, at item 930 whether all primitives in the tile are at infinity.

If it is determined, at item 930, that all primitives in the tile are at infinity, then the tile is written to the left eye buffer at item 935 and processing returns to item 910.

If it is determined, at item 930, that not all primitives in the tile are at infinity, then the tile is written to the infinity buffer at item 940 and processing returns to item 910.

If it is determined, at item 925, that the current tile being processed is not associated with the left eye view, then it is determined, at item 945 whether all primitives in the tile are at infinity.

If it is determined, at item 945, that all primitives in the tile are at infinity, then it is determined, at item 950, whether a corresponding tile is already in the infinity buffer.

If it is determined, at item 950, that a corresponding tile is already in the infinity buffer, then the tile is discarded at item 955 and processing returns to item 910.

The tile may discarded before any rendering has taken place, after rendering has taken placed but before write-out or anywhere between these points.

If it is determined, at item 950, that a corresponding tile is not already in the infinity buffer, then the tile is written to the right eye buffer at item 960 and processing returns to item 910.

If it is determined, at item 945, that not all primitives in the tile are at infinity, then the tile is written to the right eye buffer at item 960 and processing returns to item 910.

The above embodiments are to be understood as illustrative examples. Further embodiments.

In examples described above, a determination is made whether to use the first pixel-processed data as the second pixel-processed data or whether to process the second primitive data in the pixel processing stage to produce the second pixel-processed data. In other examples, a determination is not made whether to use the first pixel-processed data as the second pixel-processed data or whether to process the second primitive data in the pixel processing stage to produce the second pixel-processed data. In such other examples, the first pixel-processed data could always be used as the second pixel-processed data, without the need for such a determination to be made. As such, various measures (graphics processing systems, graphics processors, graphics processing pipelines, methods and computer programs) are provided in which input data is processed in a primitive generation stage of a graphics processing pipeline to produce first primitive data associated with a first view of a scene and second primitive data associated with a second view of the scene. The first primitive data is processed in a pixel processing stage of the graphics processing pipeline to produce first pixel-processed data associated with the first view. The first pixel-processed data is used as second pixel-processed data associated with the second view.

In some examples, a determination override function or feature is provided. The determination override feature is used to set the result of the determination for the second pixel-processed data, so that a given result of the determination is specified irrespective of other considerations. The determination override function therefore specifies either that the first pixel-processed data is to be used as the second pixel-processed data or that the second primitive data is to be processed in the pixel processing stage to produce the second pixel-processed data. For example, it may be desirable to subject two tiles to separate pixel processing operations even where they have the same primitives in order to apply one texture or color to one of the tiles and another texture or color to the other tiles.

In some examples, a bit is added in a fragment DCD to indicate whether or not a shading result is view-independent, in other words whether the shading result is the same for both views (view-independent) or is different for both views (view-dependent). This provides an efficient implementation in which the determination override function may be used on a per-tile basis. Each primitive which is read from the tile list is already associated with a DCD of a given draw call. The DCD indicates which shader is to be used to shade the primitive, which depth test is to be used etc. At shader compilation time, the complier may therefore indicate whether a specific fragment is view-independent and this bit is then propagated into the DCD.

Instead of tracking just the identical_geom bit described above, tracking would also involve determining whether or not all of the DCDs used for a given tile have the view-independent bit set. The results for the left eye are then only used for the right eye if both the identical_geom and view-independent bits are set, in other words if both views have identical geometries and the shading results are view-independent, i.e. the same for both views.

Driver-side tracking may be used to disable the override function on an entire frame.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the disclosure.

What is claimed is:

1. A method of operating a graphics processing system, the graphics processing system comprising a graphics processing pipeline comprising a primitive generation stage and a pixel processing stage, the method comprising:
    processing input data in the primitive generation stage to produce first primitive data associated with a first view of a scene and second primitive data associated with a second view of the scene;
    processing the first primitive data in the pixel processing stage to produce first pixel-processed data associated with the first view;
    determining, for second pixel-processed data associated with the second view, whether to use the first pixel-processed data as the second pixel-processed data or whether to process the second primitive data in the pixel processing stage to produce the second pixel-processed data, wherein the determining is based on one or more geometric properties of the first primitive data and/or one or more geometric properties of the second primitive data, and wherein the one or more geometric properties include a predetermined parallax property;
    identifying that the first primitive data and the second primitive data have the predetermined parallax property in response to determining that one or more offsets between one or more positions of one or more vertices of one or more primitives in the first primitive data and one or more positions of one or more corresponding vertices of one or more corresponding primitives in the second primitive data do not exceed one or more predetermined offset thresholds; and
    performing additional processing in the graphics processing pipeline based on the determining.

2. The method of claim 1, wherein the first primitive data is associated with a sub-region of the first view and the second primitive data is associated with a corresponding sub-region of the second view.

3. The method of claim 1, wherein the performing additional processing comprises writing the first pixel-processed data to one or more first memory locations associated with at least the first view.

4. The method of claim 1, comprising using a determination override function to make the determination for the second pixel-processed data, the determination override function specifying either that the first pixel-processed data is to be used as the second pixel-processed data or that the second primitive data is to be processed in the pixel processing stage to produce the second pixel-processed data.

5. The method of claim 1, wherein the determining is performed before the first primitive data is processed in the pixel processing stage of the graphics processing pipeline to produce the first pixel-processed data associated with the first view.

6. The method of claim 1, wherein the determining is performed after the first primitive data is processed in the pixel processing stage of the graphics processing pipeline to produce the first pixel-processed data associated with the first view.

7. The method of claim 1, wherein the one or more geometric properties include a property of one of the first primitive data and the second primitive data relative to a property of the other of the first primitive data and the second primitive data.

8. The method of claim 1, comprising identifying whether the first primitive data and the second primitive data have the predetermined parallax property based on a measure of parallax associated with any primitives in the first primitive data and any corresponding primitives in the second primitive data.

9. The method according of claim 1, wherein the one or more geometric properties include an absolute property of the first primitive data and/or the second primitive data.

10. The method of claim 1, wherein the one or more geometric properties include an infinite distance property.

11. The method of claim 10, comprising determining that the first pixel-processed data is to be used as the second pixel-processed data in response to identifying that the first primitive data and the second primitive data both have the infinite distance property.

12. The method of claim 1, wherein the one or more geometric properties include a geometric similarity property, the method comprising determining that the first pixel-processed data is to be used as the second pixel-processed data in response to identifying that any primitives in the first primitive data are the same or substantially the same as any primitives in the second primitive data.

13. The method of claim 1, wherein the one or more geometric properties include a geometric similarity property, the method comprising determining that the second primitive data is to be processed in the pixel processing stage to produce the second pixel-processed data in response to identifying that one or both of the first primitive data and the second primitive data have at least one primitive that is not the same or substantially the same as a primitive in the other of the first primitive data and the second primitive data.

14. The method of claim 1, comprising identifying whether the first primitive data has the one or more geometric properties and/or the second primitive data has the one or more geometric properties based on one or more geometric property indicators associated with the first primitive data and/or one or more geometric property indicators associated with the second primitive data.

15. The method of claim 1, wherein at least one of the one or more predetermined offset thresholds has a value of zero.

16. The method of claim 1, wherein at least one of the one or more predetermined offset thresholds has a non-zero value.

17. The method of claim 16, wherein the one or more predetermined offset thresholds include a predetermined error margin offset threshold, the method comprising selecting the predetermined error margin offset threshold to account for vertex snapping.

18. The method of claim 16, wherein the one or more predetermined offset thresholds include a predetermined interocular offset threshold, the method comprising selecting the predetermined interocular offset threshold to account for interocular shift.

19. A non-transitory computer-readable storage medium comprising computer-executable instructions which, when executed by a processor, cause a computing device to operate a graphics processing system, the graphics processing system comprising a graphics processing pipeline comprising a primitive generation stage and a pixel processing stage, operating the graphics processing system comprising:
    processing input data in the primitive generation stage to produce first primitive data associated with a first view of a scene and second primitive data associated with a second view of the scene;
    processing the first primitive data in the pixel processing stage to produce first pixel-processed data associated with the first view;
    determining, for second pixel-processed data associated with the second view, whether to use the first pixel-processed data as the second pixel-processed data or whether to process the second primitive data in the pixel processing stage to produce the second pixel-processed data, wherein the determining is based on one or more geometric properties of the first primitive data and/or one or more geometric properties of the second primitive data, and wherein the one or more geometric properties include a predetermined parallax property;
    identifying that the first primitive data and the second primitive data have the predetermined parallax property in response to determining that one or more offsets between one or more positions of one or more vertices of one or more primitives in the first primitive data and one or more positions of one or more corresponding vertices of one or more corresponding primitives in the second primitive data do not exceed one or more predetermined offset thresholds; and
    performing additional processing in the graphics processing pipeline based on the determining.

20. A graphics processing system comprising a graphics processing pipeline, the graphics processing pipeline comprising a primitive generation stage and a pixel processing stage, the graphics processing system being arranged to:
    process input data in the primitive generation stage to produce first primitive data associated with a first view of a scene and second primitive data associated with a second view of the scene;
    process the first primitive data in the pixel processing stage to produce first pixel-processed data associated with the first view;
    determine, for second pixel-processed data associated with the second view, whether to use the first pixel-processed data as the second pixel-processed data or whether to process the second primitive data in the pixel processing stage to produce the second pixel-processed data, wherein the determination is based on one or more geometric properties of the first primitive data and/or one or more geometric properties of the second primitive data, and wherein the one or more geometric properties include a predetermined parallax property;
    identifying that the first primitive data and the second primitive data have the predetermined parallax property in response to determined that one or more offsets between one or more positions of one or more vertices of one or more primitives in the first primitive data and one or more positions of one or more corresponding vertices of one or more corresponding primitives in the second primitive data do not exceed one or more predetermined offset thresholds; and
    perform additional processing in the graphics processing pipeline based on the determining.

* * * * *